United States Patent Office 3,403,469
Patented Oct. 1, 1968

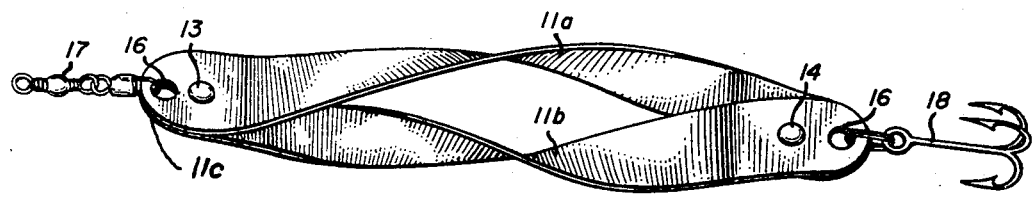
Fig_1
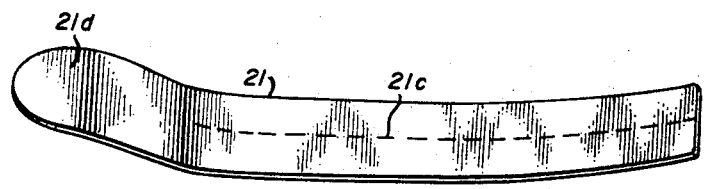
Fig_2
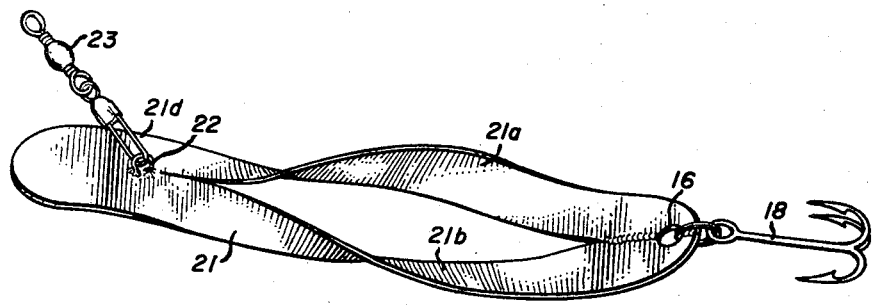
Fig_3

3,403,469
FISH LURE
Jack W. Whitney, 152 Palmer Ave.,
Mountain View, Calif. 94040
Filed Apr. 11, 1966, Ser. No. 541,832
6 Claims. (Cl. 43—42.06)

ABSTRACT OF THE DISCLOSURE

A fish lure having a main body comprised of a pair of spaced leg members, joined at their ends, and twisted along their length in opposite directions through substantially the same angle.

This invention relates in general to fish lures, and relates more particularly to such lures for simulating a live minnow or the like.

The art of fish lures is a well-worked one, with a multitude of different structures proposed, and each alleged by its originator to be extremely effective in attracting fish. In general, a fish lure is intended to simulate the movements, and at least to some extent, the appearance, of a live water creature, such as a minnow, on which the fish to be attracted might feed. Accordingly, most such lures are provided with shiny or highly reflective surfaces and are constructed so as to have considerable motion as they move through the water while trolling, casting or during their ascent and decent in bottom fishing.

In accordance with the present invention, there is provided a fish lure which provides all of the desirable characteristics of an effective lure, and which is also extremely simple and inexpensive to manufacture, and is rugged and troublefree in use. In this invention, the lure has a body portion including a pair of spaced leg members having their adjacent ends joined together. These leg members are twisted along their lengths between their joined ends through an angle of approximately 180 degrees, and in the preferred embodiment, the direction of twist of each leg member is opposite to the direction of twist of the other leg member. In one form of the invention, the lure body is formed of two separate strips of material which are twisted as described above and then joined together at the ends thereof. In an alternate embodiment, the body portion is a unitary piece of material which is bifurcated along a substantial portion of its length to form two leg members which may be twisted as described and their ends joined. As an additional feature of the invention, the leading position of the lure may be provided with a curved portion which facilitates steering of the lure through the water.

Both embodiments of this invention produce a fish lure which is extremely active when in motion in the water, oscillating about its point of line attachment (weaving motion) under the action of the water flow over the twisted leg members, to produce a highly effective lure structure.

It is therefore an object of this invention to provide an improved fish lure which closely simulates the motion and appearance of a fish or the like when moving through the water.

It is a further object of this invention to provide a fish lure employing a pair of spaced leg members which are joined at the ends thereof and which are twisted along their lengths between the joined ends to produce a highly effective non-revolving motion of the lure as it moves through the water.

It is a further object of the present invention to provide an improved fish lure which is simple and inexpensive to manufacture and is rugged and troublefree in use.

Objects and advantages other than those set forth above will be apparent from the following description when read in connection with the accompanying drawing, in which:

FIGURE 1 is a perspective view of one embodiment of the invention utilizing two separate strips of material to form the lure;

FIGURE 2 is a perspective view of a unitary piece of material which may be employed to form an alternate form of the lure of this invention; and FIGURE 3 is a perspective view of a lure formed from the piece of material of FIGURE 2.

Referring to FIGURE 1, one embodiment of the invention is shown employing a pair of separate strips of material to form leg members 11a, 11b. Leg members 11a, 11b may be formed of any suitable highly reflective material such as brass, stainless steel, chrome-plated brass or an appropriate plastic material. As seen in FIGURE 1, leg members 11a, 11b are generally of the same length and have their opposite ends joined together. Between these joined ends, each leg member is twisted along its length through approximately 180 degrees, and preferably, this direction of twist for each leg member is opposite to the direction of twist of the other leg member.

In fabricating the lure of FIGURE 1, leg members 11a, 11b may be joined together at one end thereof as by a rivet 13, and the leg members then twisted through 180 degrees, preferably with twists in opposite directions. The opposite ends of leg members 11a, 11b may then be brought together and joined by a rivet 14. As an alternate method of fabricating the lure of FIGURE 1, leg members 11a, 11b may be first twisted separately in the desired manner and their opposite ends thereof joined together by rivets 13, 14 to produce the same structure. The body of the lure may also be provided with openings 16 at opposite ends thereof for receiving connections for a fishing line 17 and one or more hooks 18.

In the embodiment illustrated in FIGURES 2 and 3, the lure is formed from a unitary piece of material 21 (FIGURE 2) which is bifurcated or split along approximately 80% of its length, as indicated by the line 21c in FIGURE 2. This bifurcation forms separate leg members 21a, 21b which may then be twisted along their lengths through approximately 180 degrees, and preferably in opposite directions. The separate ends of leg members 21a, 21b are then joined together by suitable means, such as rivets, or by welding or soldering as shown in FIGURE 3. This produces a structure similar to that of FIGURE 1, with the two leg members twisted through approximately 180 degrees in opposite directions. This lure is preferably provided with an eye 22 for connection to a line 23. Hook 18 may be attached in the same manner as shown in FIGURE 1.

In both of the illustrated embodiments, the body portion of the lure is preferably provided with a leading portion at the front thereof which is curved so as to facilitate steering of the lure through the water when casting or trolling. This leading portion is identified by reference character 11c in FIGURE 1 and by 21d in FIGURE 3. It will be seen that these portions are curved relative to the rest of the lure so as to assist in steering the lure through the water.

In the use of a lure constructed in accordance with this invention, the oppositely twisted leg members impart an oscillatory motion to the lure while preventing rotation, which closely simulates the appearance of a live minnow or the like. The laterally oscillating motion of the highly light-reflective material results in a lure which is extremely effective in attracting fish. It will also be seen that the lure of this invention is extremely simple and inexpensive to fabricate, is sturdy and rugged, and is relatively snag-free because of its open structure.

What is claimed is:

1. A fishing lure comprising:

a body portion having a pair of leg members, the corresponding ends of said leg members being joined to each other, each said leg member being twisted along its length between the ends thereof through the same angle but in a direction opposite to that of the other; and hook and line connections at opposite ends of said body portion in the direction of the length of said leg members.

2. A fishing lure in accordance with claim 1 in which each of said leg members is twisted through approximately 180 degrees.

3. A fishing lure in accordance with claim 2 in which said leg members comprise separate strips of material.

4. A fishing lure in accordance with claim 1 in which said body portion comprises a unitary piece of material which is bifurcated along approximately 80% of its length to form the two leg members which are twisted along their lengths through approximately 180 degrees.

5. A fishing lure in accordance with claim 1 in which said body portion includes a curved leading edge portion for steering the lure through the water.

6. A fishing lure in accordance with claim 1 in which said line connection is spaced from the end and proximate to the point of joinder of said leg members.

References Cited

UNITED STATES PATENTS

| | | | |
|---|---|---|---|
| D. 191,614 | 10/1961 | Elrod. | |
| 1,566,059 | 12/1925 | Willson | 43—42.51 |
| 2,736,982 | 3/1956 | Curtis | 43—42.51 |
| 2,833,077 | 5/1958 | Benoit | 43—42.06 |
| 2,849,826 | 9/1958 | Kjormoe | 43—42.51 |

SAMUEL KOREN, *Primary Examiner.*

D. J. LEACH, *Assistant Examiner.*